United States Patent
Armangau et al.

(10) Patent No.: US 10,261,944 B1
(45) Date of Patent: Apr. 16, 2019

(54) MANAGING FILE DELETIONS IN STORAGE SYSTEMS

(71) Applicant: EMC Corporation, Hopkinton, MA (US)

(72) Inventors: Philippe Armangau, Acton, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 15/083,687

(22) Filed: Mar. 29, 2016

(51) Int. Cl.
*G06F 17/30* (2006.01)
*G06F 16/11* (2019.01)
*G06F 16/23* (2019.01)
*G06F 16/16* (2019.01)

(52) U.S. Cl.
CPC .......... *G06F 16/128* (2019.01); *G06F 16/162* (2019.01); *G06F 16/23* (2019.01); *G06F 17/30088* (2013.01); *G06F 17/30117* (2013.01); *G06F 17/30345* (2013.01)

(58) Field of Classification Search
CPC ... G06F 17/30; G06F 16/162; G06F 17/30088
USPC ....................................................... 707/822
See application file for complete search history.

(56) References Cited

U.S. PATENT DOCUMENTS

| | | | |
|---|---|---|---|
| 7,769,722 B1* | 8/2010 | Bergant | G06F 17/30212 707/681 |
| 2004/0167898 A1* | 8/2004 | Margolus | G06F 17/30368 |
| 2005/0065986 A1* | 3/2005 | Bixby | G06F 17/30088 |
| 2006/0047926 A1* | 3/2006 | Zheng | G06F 3/0608 711/162 |
| 2015/0081993 A1* | 3/2015 | Christopher | G06F 11/1451 711/162 |
| 2016/0103739 A1* | 4/2016 | Huang | G06F 11/1451 714/19 |

* cited by examiner

*Primary Examiner* — Thu Nguyet T Le
(74) *Attorney, Agent, or Firm* — Krishnendu Gupta; Deepika Bhayana

(57) ABSTRACT

A method is used in managing file deletions in storage systems. A request to delete a set of replicas of a file of a file system is received. A replica of the file represents a state of the file at a particular prior point in time. A sibling indirect block associated with a portion of the file identified for deletion is identified. The sibling indirect block includes a set of file system blocks. A set of indirect blocks associated with replicas of the file is identified. The sibling indirect block and the set of indirect blocks share a subset of the set of file system blocks where the set of indirect blocks have been identified for deletion. Weight information associated with the subset of the set of file system blocks shared among the set of indirect blocks that have been pending deletion is merged. The set of indirect blocks are processed for deletion concurrently. Metadata of the sibling indirect block is updated with the merged weight information.

16 Claims, 11 Drawing Sheets

MANAGING FILE DELETIONS IN STORAGE SYSTEMS

BACKGROUND

Technical Field

This application relates to managing file deletions in storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file. Snapshot copies are in widespread use for on-line data backup. If a file becomes corrupted, the file is restored with its most recent snapshot copy that has not been corrupted.

Although existing various methods provide reasonable means of writing data to file systems stored to a persistent storage, providing access to data of file systems and creating a replica of file systems, they also come with a number of challenges, especially when efficiently deleting a snapshot copy of a file of a file system. It may be difficult or impossible for the conventional snapshot copy facility to efficiently delete multiple snapshot copies of a file of a file system.

SUMMARY OF THE INVENTION

A method is used in managing file deletions in storage systems. A request to delete a set of replicas of a file of a file system is received. A replica of the file represents a state of the file at a particular prior point in time. A sibling indirect block associated with a portion of the file identified for deletion is identified. The sibling indirect block includes a set of file system blocks. A set of indirect blocks associated with replicas of the file is identified. The sibling indirect block and the set of indirect blocks share a subset of the set of file system blocks where the set of indirect blocks have been identified for deletion. Weight information associated with the subset of the set of file system blocks shared among the set of indirect blocks that have been pending deletion is merged. The set of indirect blocks are processed for deletion concurrently. Metadata of the sibling indirect block is updated with the merged weight information.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
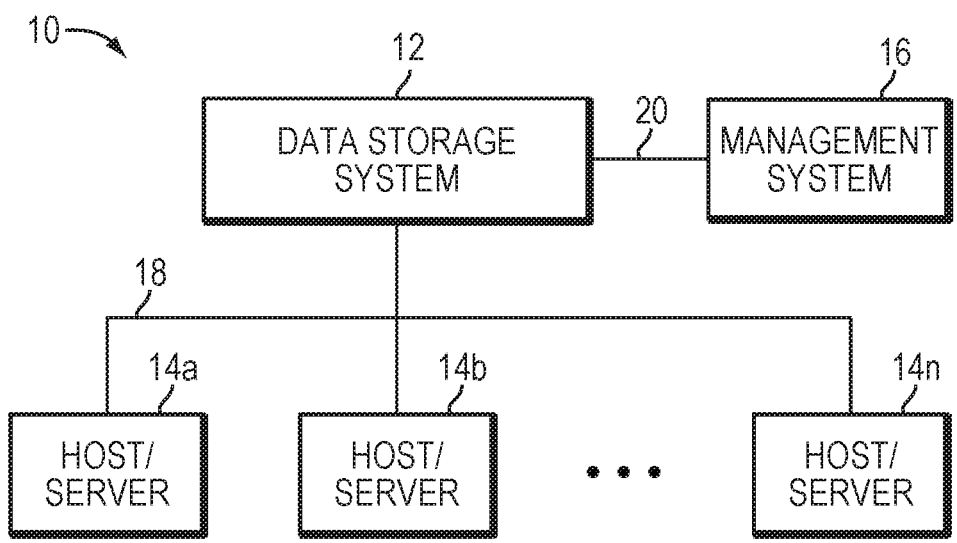
FIGS. 1-2 are examples of an embodiment of a computer system that may utilize the techniques described herein.

Described below is a technique for use in managing file deletions in storage systems, which technique may be used to provide, among other things, receiving a request to delete a set of replicas of a file of a file system, wherein a replica of the file represents a state of the file at a particular prior point in time, identifying a sibling indirect block associated with a portion of the file identified for deletion, wherein the sibling indirect block includes a set of file system blocks, identifying a set of indirect blocks associated with replicas of the file, where the sibling indirect block and the set of indirect blocks share a subset of the set of file system blocks, where the set of indirect blocks have been identified for deletion, merging weight information associated with the subset of the set of file system blocks shared among the set of indirect blocks that have been pending deletion, wherein the set of indirect blocks are processed for deletion concurrently, and updating metadata of the sibling indirect block with the merged weight information.

Generally, a storage extent is a logical contiguous area of storage reserved for a user requesting the storage space. A storage extent may include a set of disks having different RAID levels. A disk may be a physical disk within the storage system. A LUN may be a logical unit number which is an identifier for a logical unit representing a portion of disk storage. Each slice of data may have a mapping to the location of the physical drive where it starts and ends. A LUN presented to a host system may be organized as a file system by a file system mapping logic of a storage system.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

A snapshot (also referred to herein as "replica", "checkpoint", and "snap") is a point-in-time copy of data (e.g., a production file). Generally, storage applications use snapshots to protect production data and ensure consistency of the production data. Generally, snapshots of data are created at a regular time interval. Further, a snapshot of a production data may become obsolete when new snapshots of the production data are created. Each snapshot of data has a unique identification. An old snapshot may be refreshed by reusing identification of the old snapshot. A set of replicas of a file may be logically organized together in a version set.

Typically, a file delete operation deletes a file of a file system in a storage system. When a file is deleted, each file system block of the file is deleted and marked as a free file system block. Further, a file may be truncated by deleting a portion of the file. During a file truncate operation, each file system block that is a part of a portion of the file which is being truncated is deleted. When a file system block is deleted, a parent file system block which includes a mapping pointer pointing to the file system block is updated to indicate that the mapping pointer no longer points to the file system block. By updating the mapping pointer in such a way creates a hole such that the mapping pointer is marked as unused indicating that the mapping pointer no longer points to any file system block. Thus, upon receiving a request to delete a file or a portion of the file, a file system hierarchy of the file or the portion of the file is iterated to free each file system block of the file system hierarchy of the file or the portion of the file. An indirect block at the lowest level of a file system hierarchy of a file is known as a leaf indirect block. Each leaf indirect block of the file system hierarchy of a file or a portion of the file is processed for deleting data blocks pointed to by each leaf indirect block.

Further, a file system block is deleted based on the ownership status of the file system block. Thus, a delete operation on a file system block decrements the reference count in the per-block metadata of a child block by a full weight or a partial weight depending on whether or not the deleted file system block did not share the child block or did share the child block.

Further, if a file system block is not shared but owned by a parent file system block which points to the file system block, the owned file system block is deleted by freeing the file system block. Further, when a file system block of a file of a file system is deleted, metadata such as superblock of the file, the size of the file, and a mapping pointer in a parent file system block pointing to the file system block is updated to indicate that the file system block is a free file system block which may be reused. Further, after updating metadata of a file system block of a file upon receiving a request to delete the file system block, a metadata transaction entry is created and stored in a journal such as a file system transaction log. Further, when a shared file system block is deleted by returning a weight for the shared file system block, a metadata transaction entry created in such a case indicates a return weight transaction. Moreover, when a file system block owned by a parent file system block is deleted by freeing the file system block, a metadata transaction entry created in such a case indicates a free block transaction.

Conventionally, a file delete operation to delete a file traverses the entire file system block hierarchy of the file in order to delete each file system block of the file and creates a metadata transaction entry for each file system block deleted by the file delete operation. Similarly, in such a conventional system, a file truncate operation to truncate a file by deleting a portion of the file traverses a file system block hierarchy associated with the portion of the file in order to delete each file system block included in the portion of the file and creates a metadata transaction entry for each file system block deleted by the file truncate operation. Generally, per-block metadata (also referred to herein as "BMD") of a file system block stores a total distributed reference count value for the file system block. In a conventional system, a metadata transaction entry created for a file system block that is being deleted indicates return of the reference count value (or "weight") of the file system block to the per-block metadata of the file system block. In such a conventional system, if a delete operation or a truncate operation is performed on a large file, for example, a file with the size of 100 gigabytes (GB), the delete or truncate operations may require a large amount of time such as minutes to delete or truncate the file because the delete or truncate operations either traverses the entire file system block hierarchy or a large portion of the file system block hierarchy of the file for deleting file system blocks of the file and creates a metadata transaction entry for each file system block being deleted and stores the metadata transaction entry in a file system transaction log, and later updates metadata organized on a storage device by flushing the file system transaction log. Further, in such a conventional system, reading and updating of per-block metadata structures of each file system block of a file system hierarchy of a file requires a significant amount of time in case the size of the file system block hierarchy is large.

Further, in such a conventional system, when a replica of a file is deleted, the entire file system block hierarchy of the replica of the file is evaluated. Further, in such a conventional system, per-block metadata of each file system block in the file system block hierarchy of the replica of the file being deleted is read and updated to return the distributed reference count for each file system block to indicate that the respective file system block has been deleted. As a result, in such a conventional system, a large number of metadata transactions are created which in turn needs to get flushed to a storage device resulting into a large number of I/Os on the storage device. Consequently, in such a conventional system, a large number of resources of a storage system are consumed resulting in increase in CPU consumption because a large amount of data is copied to and from a memory and a large number of locks for file system and storage system structures are acquired and released.

Alternatively, in such a conventional system, distributed reference count of shared file system blocks of a file may be returned to per-block metadata of another file system block of another file and/or replica of the file which is included in a version set for the file. In such a conventional system, when an indirect block of a file system block hierarchy of a file is selected for deletion during a file truncate or file delete operations directed to the file included in a version set, an indirect block associated with another file and/or replica of the file included in the version set (also referred to herein as "sibling indirect block") is identified such that both indirect blocks share a set of data blocks that have been selected for deletion. Thus, in such a conventional system, in such a case, distributed weight for each shared data block included in an indirect block is returned to metadata of a sibling indirect block instead of reading and updating per-block metadata of each shared data block. However, in such a conventional system, distributed weight for each shared data block included in an indirect block is returned to metadata of a sibling indirect block one at a time. Further, in such a conventional system, indirect blocks identified for deletion are processed for returning distributed weights for shared data blocks to metadata of a sibling indirect block one at a time. Thus, in such a conventional system, there does not exists any technique or mechanism to return distributed weights for shared data blocks from multiple indirect blocks to metadata of a sibling indirect block. Consequently, in such a conventional system, if the size of a file is large and/or a large number of replicas of a file are identified for deletion, merging distributed weight for each indirect block of a file identified for deletion with a sibling indirect block one at a time consume a large number of resources and requires a large amount of time.

By contrast, in at least some implementations in accordance with the technique as described herein, the current technique optimizes file truncate and file delete operations by merging distributed reference count of shared file system blocks from a set of indirect blocks of a set of replicas identified for deletion into a merged weight value, updating a sibling indirect block with the merged weight value, and deleting the set of indirect blocks concurrently. In at least one embodiment of the current technique, when a set of indirect blocks of file system block hierarchies of a set of replicas of a file is selected for deletion during a file truncate or file delete operations directed to the set of replicas of the file included in a version set, an indirect block associated with another file and/or replica included in the version set (also referred to herein as "sibling indirect block") is identified such that the set of indirect blocks and the sibling indirect block share a set of data blocks that have been selected for deletion. Thus, in at least one embodiment of the current technique, in such a case, distributed weight for each shared data block included in the set of indirect blocks is merged into a merged weight value and the merged weight value is returned to metadata of the sibling indirect block instead of reading and updating per-block metadata of each shared data block in the set of indirect blocks one at a time.

In at least some implementations in accordance with the technique as described herein, the use of the managing file deletions in storage systems technique can provide one or more of the following advantages: improving memory utilization by reducing the number of times file system locks are acquired and released, improving I/O performance of a system by reducing the number of I/Os generated during a file delete and file truncate operations, and improving host I/O performance by efficiently deleting or truncating a file by deleting multiple snaps concurrently and reducing the number of metadata transactions.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
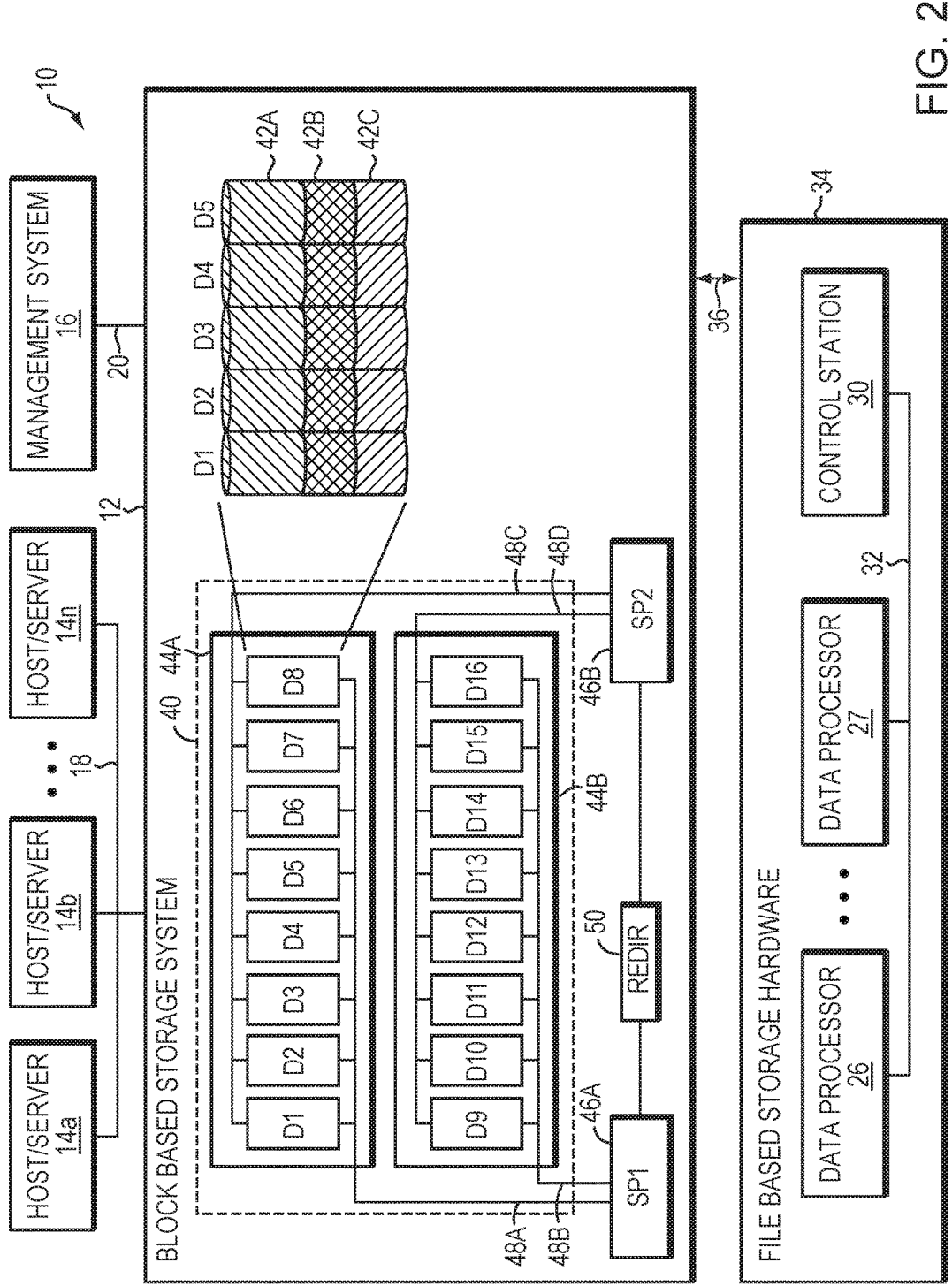

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein. Thus, it should be noted that data storage system 12 may include any number of storage processors.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Figure 3:
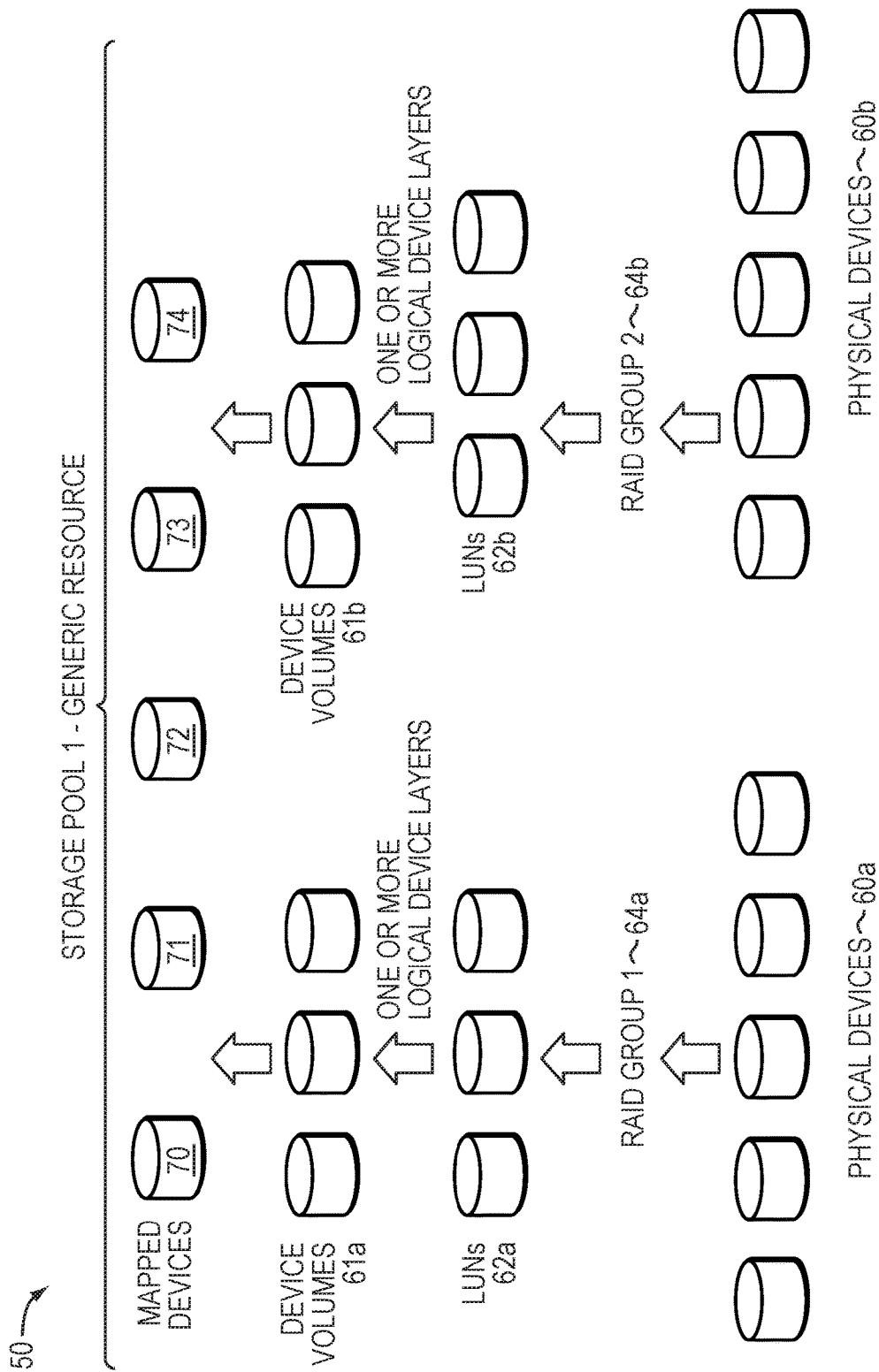
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
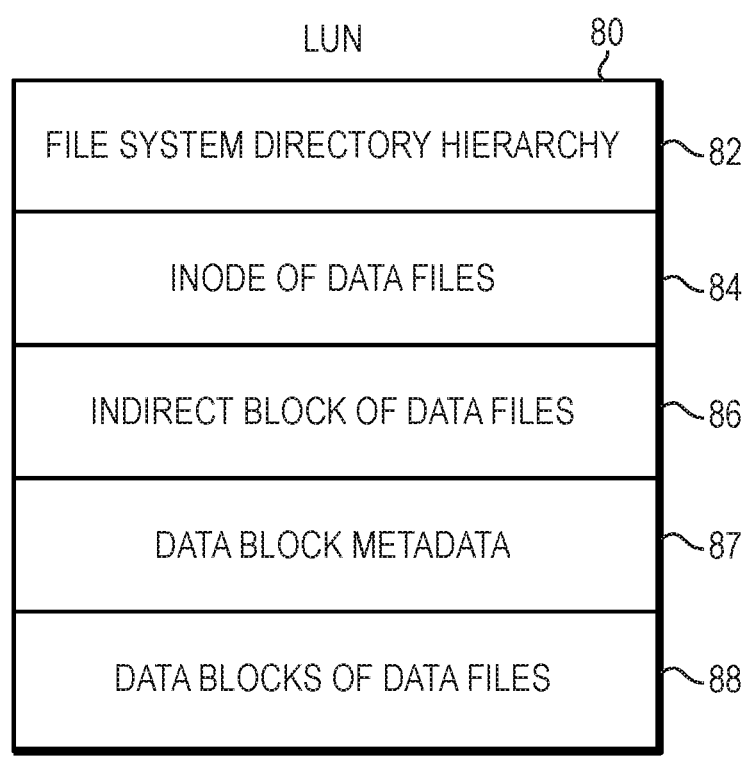
FIGS. 4-9 are diagrams illustrating in more detail components that may be used in connection with techniques herein.

Referring to FIG. 4, shown is a logical representation of a LUN presented to a host and organized as a file system that may be included in an embodiment using the techniques herein. A user of data storage system 12 accesses data from LUNs stored on disk drives 60 in fixed sized chunks. Each fixed size chunk is known as a slice. One or more slices are grouped together to create a slice pool. Host system 14 provisions storage from slice pools for creating LUNs. A LUN 80 is visible to host system 14 and a user of a data storage system 12. Typically, storage is allocated when host system 14 issues a write request and needs a data block to write user's data.

File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 82 in the file system. Inodes of data files 84 depend from the file system directory hierarchy 82. Indirect blocks of data files 86 depend from the inodes of the data files 84. Data block metadata 87 and data blocks of data files 88 depend from the inodes of data files 84 and from the indirect blocks of data files 86.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block. However, it should be noted that a file system may be organized based on any one of the known mapping techniques such as an extent based binary tree mapping mechanism.

Figure 5:
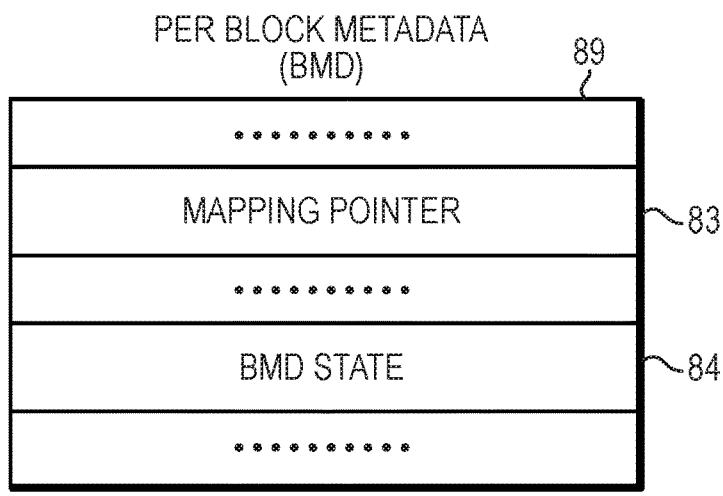

Referring to FIG. 5, shown is a representation of a per block metadata (also referred to as "BMD") for a file system data block that may be included in an embodiment using the techniques described herein. The per-block metadata 89 for a file system data block includes an inode number of a file of the file system, the file system data block number and the logical offset of the file system data block. The per-block metadata 89 for a file system data block also includes an internal checksum protecting the integrity of the information stored in the per-block metadata 89. The per-block metadata for a file system data block may further include a mapping pointer 83 and a data structure indicating state of the per-block metadata 84. The representation of per-block metadata 89, as illustrated in FIG. 5, is for illustrative purposes only, and is not considered a limitation of the current technique described herein.

Figure 6:
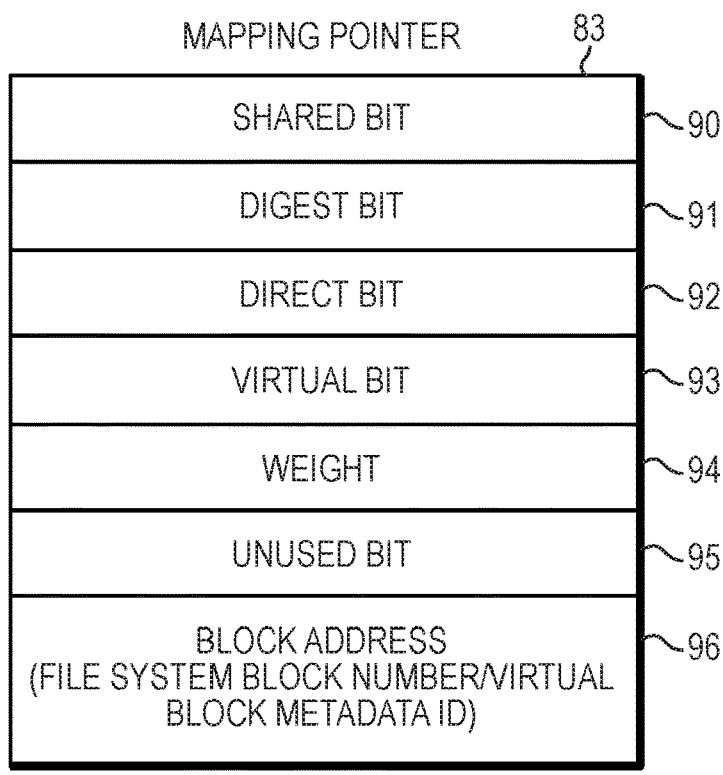

Referring to FIG. 6, shown is a representation of a mapping pointer 83 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block. Mapping pointer 83 includes metadata information such as shared bit 90, digest bit 91, direct bit 92, virtual bit 93, weight 94, unused bit 95 and block address 96. Shared bit 90 of mapping pointer 83 associated with a file system data block indicates whether the data block (or data blocks if the mapping pointer is associated with an indirect block) may be shared. Digest bit 91 of mapping pointer 83 for a file system block indicates whether the file system block has been digested by a deduplication engine. Direct bit 92 of mapping pointer 83 for a file system block indicates whether the physical address of the file system block can be computed algorithmically. Virtual bit 93 of mapping pointer 83 for a file system block indicates whether the mapping pointer is a virtual pointer. Weight 94 of mapping pointer 83 for a file system block indicates a delegated reference count for the mapping pointer 83. The delegated reference count is used by a snapshot copy facility when a replica of a file is created. Mapping pointers of the inode of the file are copied and included in the inode of the replica of the file. In at least one embodiment, mapping pointers of the inode may include mapping pointers pointing to direct data blocks and mapping pointers pointing to indirect blocks. Then, the delegated reference count values stored in the mapping pointers of the file and the replica of the file are updated to indicate that the file and the replica of the file share data blocks of the file.

Unused bit 95 of mapping pointer 83 for a file system block indicates an unused space reserved for a future use. Block address 96 of mapping pointer 83 for a file system block indicates the block number of the file system block. Alternatively, block address 96 of mapping pointer 83 may indicate a Virtual Block Metadata ("VBM") identification number which points to a VBM object that points to a data block and includes metadata for the data block. Thus, VBM ID 96 is used to find an object including virtual block metadata. Thus, a VBM object includes file system data block mapping pointer as described in FIG. 6. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a client of a storage system to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers in inodes and indirect blocks pointing to the data blocks.

The representation of mapping pointer 83, as illustrated in FIG. 6, is for illustrative purposes only, and is not considered a limitation of the current technique described herein. Thus, it should be noted that fields 90-95 included in the mapping pointer 83 may reside in different metadata structures.

Figure 7:
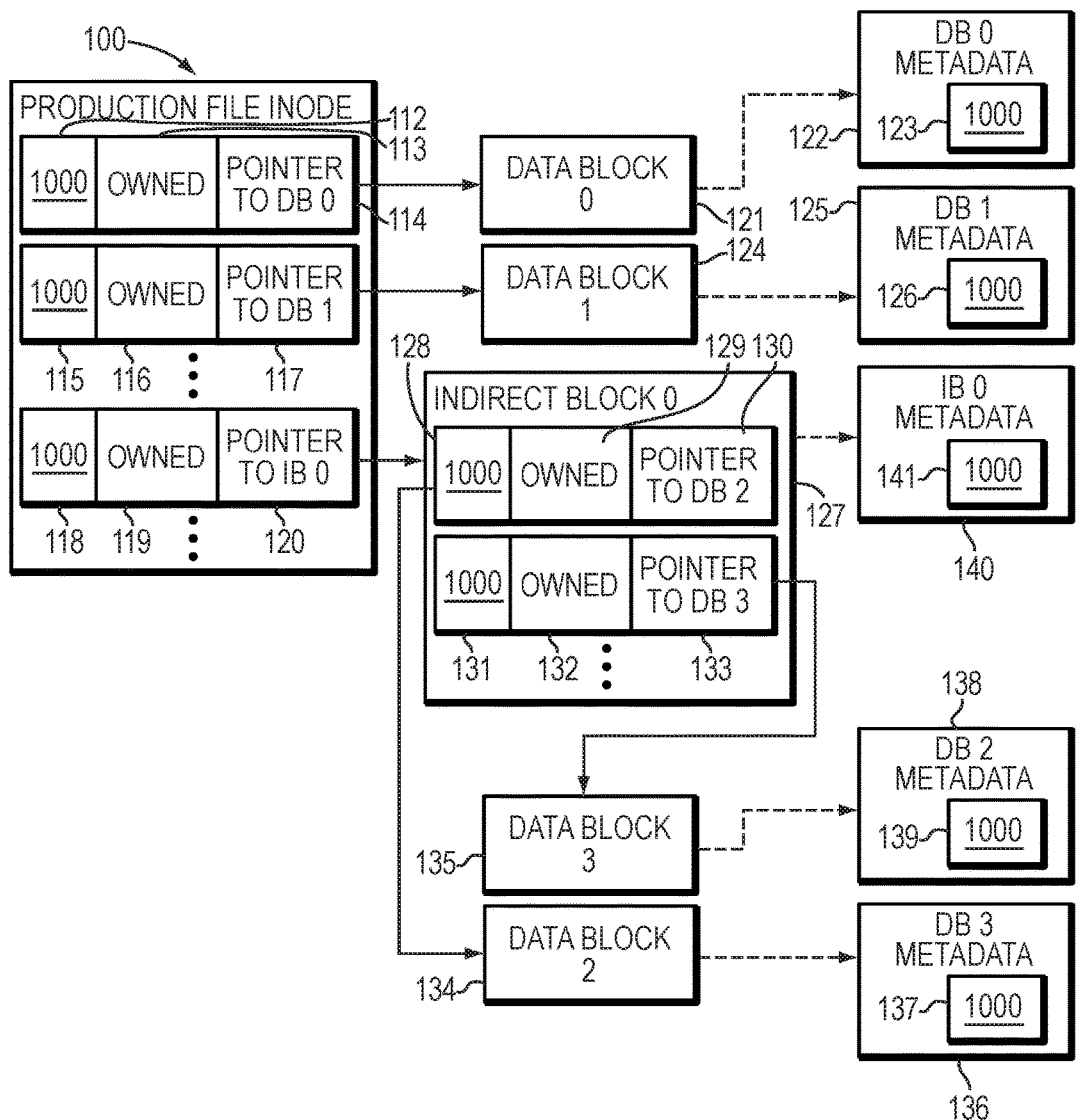

Referring to FIG. 7, shown is a more detailed representation of components that may be included in an embodiment using the techniques described herein. As shown in FIG. 7, for example, a production file inode 100 (also referred to as "working file") includes a set of mapping pointers representing a file system block hierarchy of the production file. The set of mapping pointers includes the first mapping pointer field which further includes a delegated reference count 112, shared flag 113 indicating whether the data block pointed to by the first mapping pointer is shared by other data blocks, and a block pointer 114 pointing to a first file system data block ("Data Block 0") 121. The block pointer 114 is a file system block number of the first data block 121. The first data block 121 has associated per-block metadata 122 including a reference count 123. The per-block metadata 122 of the first data block 121, for example, is organized as table separate from the first data block 121 and indexed by the block number of the first data block 121. Further, the set of mapping pointers includes the second mapping pointer which includes a delegated reference count 115, shared flag 116, and a block pointer 117 pointing to a second file system data block ("Data Block 1") 124. The second data block 124 has associated per-block metadata 125 including a reference count 126. Further, the set of mapping pointers include a mapping pointer that points to an indirect block and includes a delegated reference count 118, shared flag 119, and a block pointer 120 pointing to the indirect block 127. The indirect block ("Indirect block 0") 124 has associated per-block metadata 140 including a reference count 141. The indirect block 124 includes mapping pointers for a set of data blocks pointed to by the indirect block 124, such as, the first mapping pointer which includes a delegated reference count 128, shared flag 129, and a block pointer 130 pointing to a third file system data block ("Data Block 2") 134 and the second mapping pointer which includes a delegated reference count 131, shared flag 132, and a block pointer 133 pointing to a fourth file system data block ("Data Block 4") 135. The third data block 134 has associated per-block metadata 136 including a reference count 137 and fourth data block 135 has associated per-block metadata 138 including a reference count 139.

In the example of FIG. 7, a delegated reference count such as 112 is associated with the parent-child block relationship indicated by the block pointer 114 by storing the delegated reference count in one or more bytes of a mapping block pointer field. The delegated reference count 112, however, could be associated with the parent-child block relationship in other ways. For example, the delegated reference count could be stored in a metadata table of the production file inode 100.

In the example of FIG. 7, a delegated reference count such as 112, 115, 118, 128, 131 has an initial full-weight value of 1,000, and the reference count such as 123, 126, 141, 137, 139 in the per-block metadata such as 122, 125, 140, 136, 138 of file system block such as 121, 124, 127, 134, 135 also has an initial full-weight value of 1,000. In other words, the initial full-weight value of 1,000 should be understood as representing a full ownership interest (i.e., a 100% ownership interest) of the file system data block. A snapshot copy facility delegates a partial ownership interest to a snapshot copy when sharing occurs between a snapshot copy and a production file.

Figure 8:
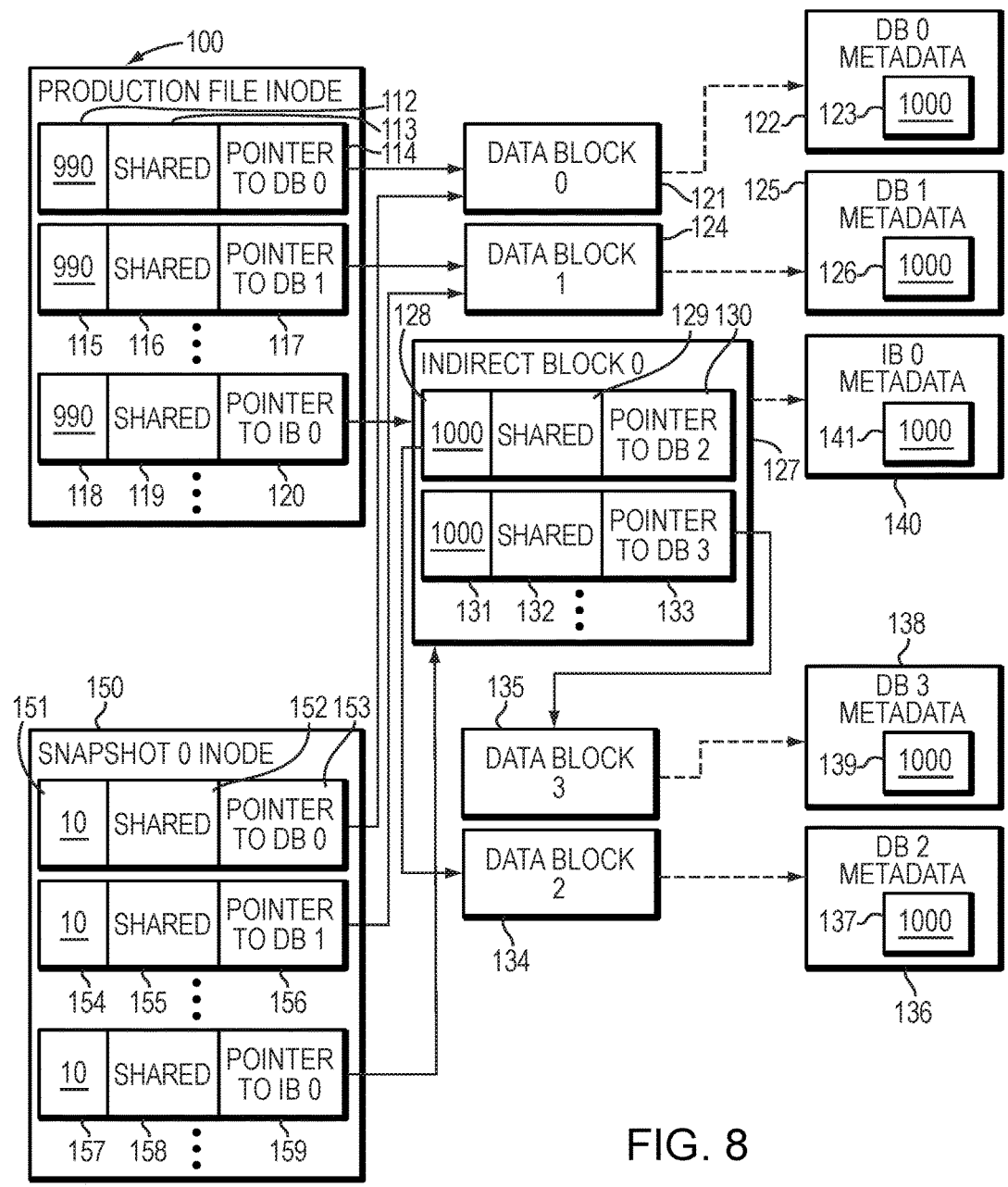

As shown in FIG. 8, when the snapshot copy facility creates a first snapshot copy of the production file, the snapshot copy facility allocates an inode 150 for the snapshot copy, and copies the content of the production file inode 100 into the snapshot copy inode 150. Then the snapshot copy facility decrements each of the delegated reference counts 112, 115, 118 included in the set of mapping pointers of the production file inode 100 by a partial-weight value of 10, and sets the delegated reference counts 151, 154, 157 in each of the mapping block pointer fields of the snapshot inode 150 to the same partial-weight value of 10. Block pointers 153, 156, 159 in snapshot inode 150 of the snapshot copy of production file now points to the same file system blocks 121, 124, 127 and sharing status flag for file system blocks 121, 124, 127 in the production file inode 100 and the snapshot copy inode 150 are updated to indicate that file system blocks 121, 124, 127 are shared by the production file and the snapshot copy of the production file. Thus, the total distributed weight of file system blocks 121, 124, 127 which is total of the delegated reference counts 112, 115, 118 of the primary inode 100 and delegated reference counts 151, 154, 157 of the snapshot inode 150 stays same with the value of 1,000.

Although in general a partial-weight value is simply smaller than a full-weight value, in most cases the ratio of the full-weight value to the partial-weight value may be greater than the maximum number of snapshot copies of a production file. For some applications, a relatively small partial weight in relationship to a limited number of snapshot copies would also permit identification of child blocks exclusively owned or shared only among snapshot files, permitting a rapid delete of all snapshot copies simply by scanning for file system blocks having a reference count value below a certain threshold, and de-allocating all such blocks.

Generally, a write split operation based on the delegated reference counting mechanism is invoked upon receiving a write I/O request for a data block. The write split operation evaluates the shared bit stored in the mapping pointer for a data block to check whether the data block has been shared after application of the snapshot copy facility. If the shared bit indicates that the data block has been shared among versions of a file, the write split operation breaks the sharing relationship of the data block and allocates a new data block for the write I/O request. If the mapping pointer that points to the data block resides in a shared indirect block, the sharing relationship of the indirect block is also broken. In such a case, the write split operation causes a new indirect block to be allocated and mapping pointers for all data blocks not involved in the write operation are copied to the new indirect block. The process of copying mapping pointers to the new indirect block includes distributing the delegated reference count values of mapping pointers between the original shared indirect block and the newly allocated indirect block. In addition to the distribution of the delegated reference count values, the shared bits of the copied mapping pointers are updated to indicate that the sharing relationship has been broken. Any reference to the old data block is released and the mapping pointer of the new data block is updated to point to the newly allocated data block. If the shared bit of the data block indicates that the data block has not been shared among versions of a file, contents of the data block are updated according to the write I/O request and the write I/O requests completes.

Figure 9:
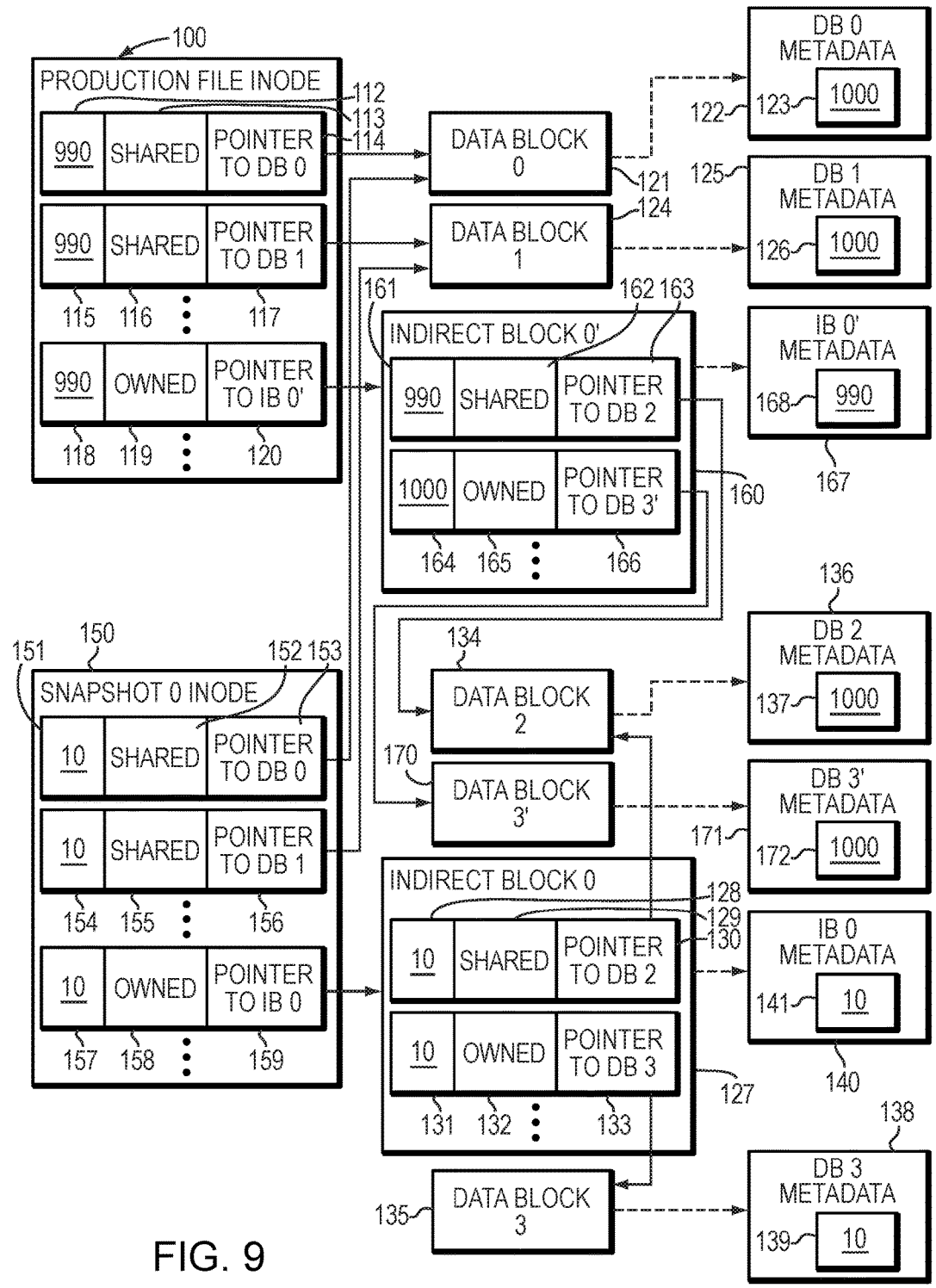

As shown in FIG. 9, with reference also to FIG. 8, when the snapshot copy facility writes to a data block such as the fourth data block ("Data Block 3") 135 referred to by indirect block 127 of the production file inode 100, a write-split operation as described above herein allocates a new indirect block 160 and a new data block ("Data Block 3") 170 such that the new indirect block 160 is updated to point to the new data block 170 and the old indirect block 127 is updated to point to the old fourth data block 135. Further, block pointer 120 in the production file inode 100 is updated to point to the new indirect block 160. Data associated with the write operation is written to the new data block 170, the reference count 172 in the per-block metadata 171 of the new data block 170 is set to a full-weight value of 1,000, sharing flag 165 in the mapping pointer pointing to the new data block 165 in the new indirect block 160 is updated to indicate that the new data block 170 is not shared, and delegated reference count 164 is set to the same full-weight value of 1,000.

Further, delegated reference count 161 is updated to a partial-weight value of 990 indicating that sharing relationships of data block ("Data Block 2") 134 which is not updated as a part of the write operation is preserved by continue sharing the data block 134 between indirect blocks 160 and 127. As a result, delegated reference count 128 in the old indirect block 127 is updated to a partial-weight value of 10 and delegated reference count 161 in the new indirect block 160 for the data block 134 is updated to a partial weight of 990 such that the total distributed weight (or reference count) 137 in the per-block metadata 136 of data block 134 remains 1,000.

Further, to indicate a split in the indirect block, the total delegated reference count 168 in the per-block metadata 167 of the new indirect block 160 is set to the partial-weight value of 990 to match with the delegated reference count value 118 of 990 in the mapping pointer included in the production file inode 100 which points to the new indirect block 160 and sharing flag 119 in the mapping pointer of the production file inode 100 for the new indirect block 160 is updated to indicate that the new indirect block 160 is not shared. Similarly, the total delegated reference count 141 in the per-block metadata 140 of the old indirect block 127 is set to the partial-weight value of 10 to match with the delegated reference count value 157 of 10 in the mapping pointer included in the snapshot copy inode 150 which points to the old indirect block 127 and sharing flag 158 in the mapping pointer of the snapshot copy inode 150 for the old indirect block 127 is updated to indicate that the old indirect block 127 is not shared.

Further, the reference count 139 in the per-block metadata 138 of the old data block 135 is decremented and is set to a partial-weight value of 10. Thus, file system data block 135 no longer remains shared between the production file and snapshot copies of the production file.

In general, the delegated reference counting mechanism as shown in FIGS. 7-9 results in the reference count in the per-block metadata of a child block of a file system being equal to the sum of all the delegated reference counts associated with all of the child's parent blocks in the file system block hierarchy of the file system. The block sharing caused by creation of snapshot copies does not change the reference count in the per-block metadata of a child block.

Conventionally, the deletion of a production file or a snapshot copy of the production file may decrement the reference count in the per-block metadata of a child block by a full weight or a partial weight depending on whether or not the deleted version did not share the child block with a related version or did share the child block with a related version.

Further, in such a conventional system, when a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect block is determined for each indirect block from file system hierarchies of snapshot copies of the file included in a version set to which the file belongs such that the indirect block and the sibling indirect block shares the most data blocks compared to other indirect blocks in the file system hierarchies. In such a conventional system, upon finding a sibling indirect block for an indirect block that has been selected for deletion, delegated reference count for each shared data block pointed to by the indirect block is returned to corresponding shared data block mapping pointer included in the sibling indirect block. Returning weight value for each shared data block pointed to by an indirect block of a file to reference count values in a sibling indirect block may also be referred to as "reverse indirect block split" operation as it operates in an opposite manner to a write split operation described above herein. However, in such a conventional system, deleting each indirect block of a file system hierarchy by returning weight of shared blocks of each indirect block to a sibling indirect block one at a time results into a large number of metadata update transactions which require a significant amount of time to complete.

Figure 10:
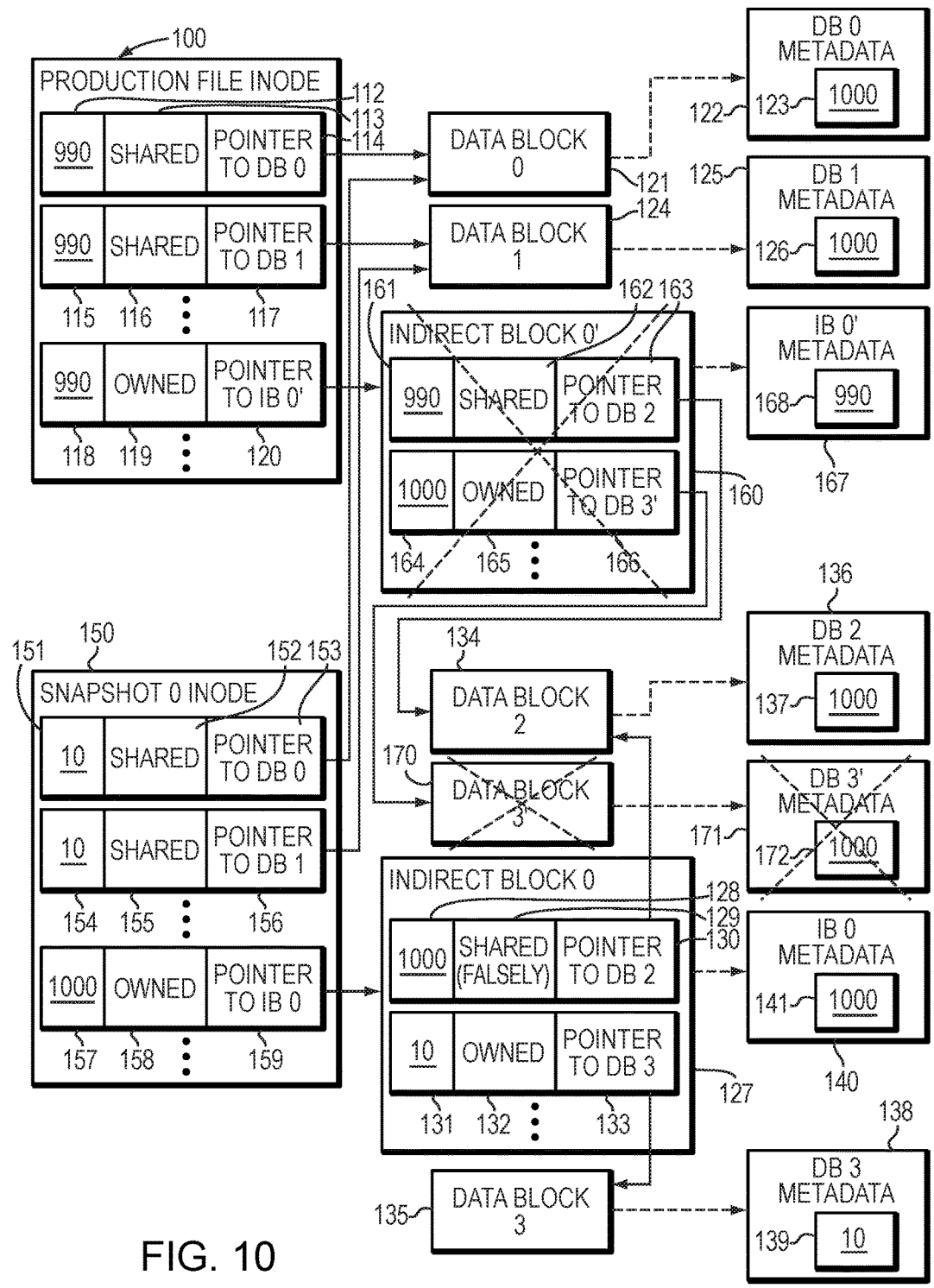
FIG. 10 is a diagram illustrating in more detail components that may be used in connection with conventional techniques.

Referring to FIG. 10, shown is a more detailed representation of components that may be included in an embodiment using the conventional technique of returning weight of shared data blocks of an indirect block to a sibling indirect block one at a time as described above herein. The file represented by file inode 100 may select a set of indirect blocks for deletion upon receiving a file delete operation or a file truncate operation. A file system hierarchy of the file is evaluated to determine the set of indirect blocks that are required to be deleted. For example, as illustrated in FIG. 10, indirect block 0' 160 is identified for deletion. Snapshot copies of the file are evaluated to determine a sibling indirect block for the indirect block. For example, in FIG. 10, a sibling indirect block 127 is found that shares a set of data blocks with indirect block 0' 160. In this example, indirect block 0' 160 includes block pointer 163 referring to "Data Block 2" 134 and block pointer 166 referring to "Data Block 3'" 166. In such an example, data block 134 is shared between the indirect block 0' 160 and the sibling indirect block 127. Conventionally, delegated reference count 161 stored in the mapping pointer of indirect block 0' 160 referring to the shared data block 134 is returned to (also referred to herein as "merged with", or "added to") delegated reference count 128 stored in the mapping pointer of the sibling indirect block 127 referring to data block 134 is updated to the full value of 1,000 if the data block 134 is no longer shared with any other snapshot copies of the file. Further, the sharing flag 129 included in the mapping pointer for the data block 134 in the indirect block 127 remains shared (also referred to herein "falsely shared") as the data block 134 may be shared by other snapshot copies of the file. The data block 3' 170 pointed to a mapping pointer included in the indirect block 160 that is being deleted is deleted by updating the per-block metadata 171 as the data block 3' 170 is not shared by the sibling indirect block 127. Further, conventionally, indirect block 0' 160 is deleted by returning the delegated reference count value 118 for the indirect block 0' 160 to the delegated reference count 157 for the indirect block 127.

Figure 11:
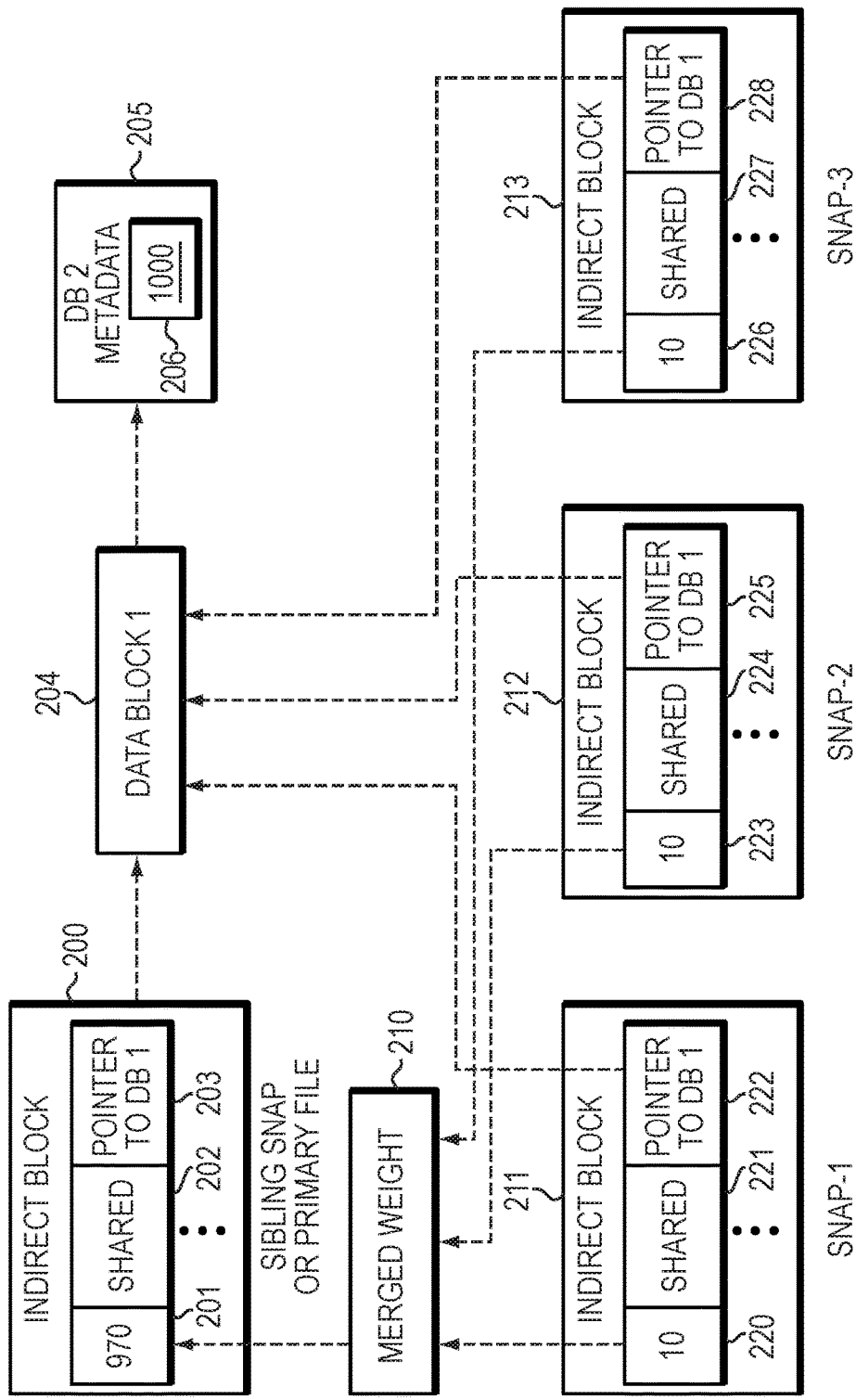
FIG. 11 is a diagram illustrating in more detail components that may be used in connection with techniques herein.

Referring to FIG. 11, shown is a more detailed representation of components that may be included in an embodiment using the current techniques described herein. In at least one embodiment of the current technique, a file delete and/or file truncate operation is performed on more than one file and/or replicas of the file within a version set. For example, as illustrated in FIG. 11, a replica (snap-1) of a file may be identified for deletion upon receiving a file delete operation or a file truncate operation for the replica. In such an example, a file system hierarchy of the replica of the file (snap-1) is evaluated to determine the set of indirect blocks that are required to be deleted. For example, as illustrated in FIG. 11, indirect block 211 is identified for deletion. Further, in at least one embodiment of the current technique, other replicas of the file and/or file (e.g., snap-2, snap-3) within a version set that are being processed for deletion or pending deletion are identified for merge weight processing. Thus, as illustrated in FIG. 11, indirect blocks (e.g., indirect blocks 212, 213) associated with such other replicas of the file and/or the files that are pending deletion are identified for the merge weight processing. Further, the file and replicas of the file within the version set are evaluated to determine a sibling indirect block for the set of indirect blocks identified for deletion. For example, in FIG. 11, a sibling indirect block 200 is determined that shares a set of data blocks with indirect blocks 211, 212, and 213. In this example, indirect blocks 211, 212, and 213 include block pointers referring to "Data Block 1" 204. In such an example, data block 204 is shared between the indirect blocks 211, 212, and 213 identified for deletion and the sibling indirect block 200. It should be noted that a sibling indirect block may be found either in a file system hierarchy of a replica of a file or in a file system hierarchy of the file. In at least one embodiment of the current technique, delegated reference count 220 stored in the mapping pointer of indirect block 211 referring to the shared data block 204, delegated reference count 223 stored in the mapping pointer of indirect block 212 referring to the shared data block 204, and delegated reference count 226 stored in the mapping pointer of indirect block 213 referring to the shared data block 204 are all merged together in a merged weight 210 (also referred to herein as "merged with", or "added to"). Further, the merged weight 210 is returned to delegated reference count 201 stored in the mapping pointer of the sibling indirect block 200 referring to data block 204 such that is updated to the full value of 1,000 if the data block 204 is no longer shared with any other snapshot copies of the file. Further, the sharing flag 202 included in the mapping pointer for the data block 204 in the sibling indirect block 200 remains shared (also referred to herein "falsely shared") as the data block 204 may be shared by other snapshot copies of the file.

Thus, in at least one embodiment of the current technique, when an indirect block of a file or a replica of the file in a version set is being processed for deletion upon receiving a file delete or file truncate operation, other replicas within the version set that have been selected for deletion are identified. Further, in at least one embodiment of the current technique, a set of indirect blocks associated with the other replicas within the version that are pending deletion are identified such that delegated reference count value of each shared data block from each of the indirect block of the set of indirect blocks is merged together in a merged weight value for a respective shared data block and the merged weight value is returned to a sibling indirect block that shares such data block. Thus, in at least one embodiment of the current technique, instead of returning distributed weight of a shared data block from an indirect block identified for deletion to a sibling indirect block one at a time, multiple indirect blocks sharing data blocks with the sibling indirect block that have been pending deletion are identified such that multiple indirect blocks are processed for deletion concurrently by merging distributed weights for a shared data blocks from each indirect block identified for deletion into a merged weight value and updating metadata of a sibling indirect block with such merged weight value.

Figure 12:
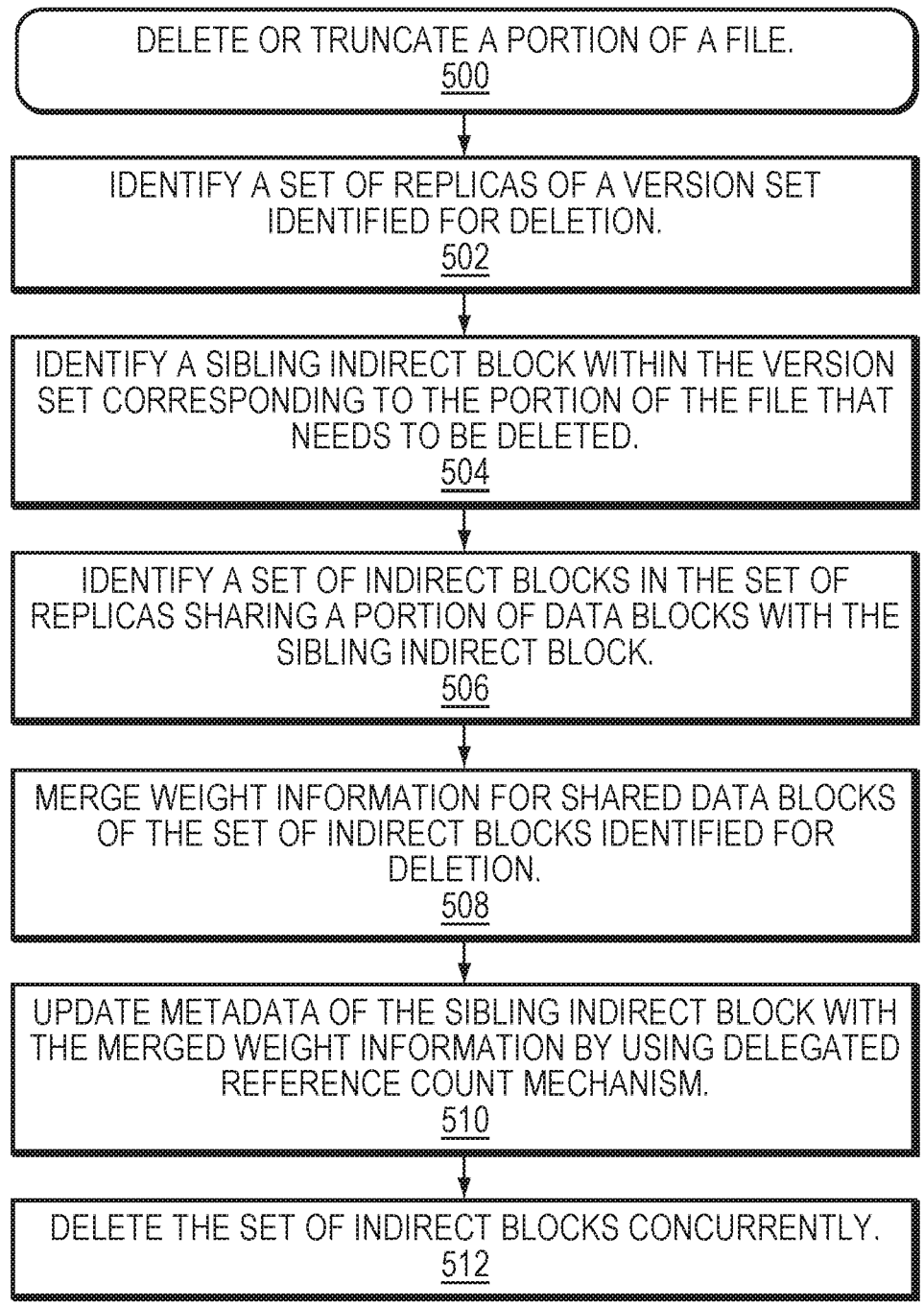
FIG. 12 is a flow diagram illustrating processes that may be used in connection with techniques herein.

Referring to FIG. 12, shown is a flow diagram illustrating a flow of data in the data storage system. With reference also to FIGS. 1-9 and 11, a file delete or a file truncate operation is performed on a file (step 500). A set of replicas of the file in a version set is identified that are in process of being deleted as a part of the file delete or file truncate operation (step 502). A sibling indirect block within the version set that share a portion of data blocks with the set of replicas that are pending deletion is identified (step 504). Further, multiple indirect blocks corresponding to the set of replicas of the file that are being deleted as a part of the file delete or file truncate operation and that share a portion of data blocks with the sibling indirect block are identified (step 506). Metadata information (e.g., delegated reference count value for a shared data block) of each data block from the multiple indirect blocks that share each data block is merged (step 508). In at least one embodiment of the current technique, delegated reference count value (also referred to herein as distributed weight) may be merged into a single merged weight value which may be stored in a data structure organized in a memory of the data storage system. Metadata (e.g., delegated reference count value for a shared data block) of the sibling indirect block is updated by the merged delegated reference count value (also referred to herein as "merged weight value") of the shared data block by using a delegated reference count mechanism described above herein (step 510). Multiple indirect blocks are deleted concurrently (step 512).

It should be noted that an indirect block may be selected from a file system hierarchy of a file when the file is deleted, the file is truncated, zeros are written to a portion of the file (also referred to as "punching a hole"), or data blocks are freed and returned to a storage device.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing file deletions in storage systems, the method comprising:
receiving a request to delete or truncate a set of replicas of a file of a file system, wherein a replica of the file represents a state of the file at a particular prior point in time, wherein the set of replicas of the file are included in a version set associated with the file;
identifying a respective set of indirect blocks associated with each replica of the set of replicas, wherein the respective set of indirect blocks need to be deleted in order to process the request to delete or truncate the set of replicas of the file, wherein each indirect block includes a set of file system blocks and the set of file system blocks are identified for deletion in order to delete the indirect block;
identifying a sibling indirect block in the file or another replica of the file in the version set, wherein the sibling indirect block includes a set of file system blocks, wherein the sibling indirect block and each respective set of indirect blocks share a subset of the set of file system blocks that have been identified for deletion in order to process the request to delete or truncate the set of replicas of the file;
merging respective weight information associated with each file system block of the subset of the set of file system blocks shared among the respective set of indirect blocks that have been identified for deletion into a single merged weight value, wherein the set of indirect blocks are processed for deletion concurrently; and
updating metadata of the sibling indirect block with the single merged weight value thereby avoiding updating metadata of each file system block of the subset of the set of file system blocks.

2. The method of claim 1, further comprising:
deleting the set of indirect blocks concurrently.

3. The method of claim 1, wherein a mapping pointer is associated with a file system block, wherein the mapping pointer includes a distributed weight indicating whether the file system block has been shared.

4. The method of claim 1, wherein merging the weight information associated with the subset of the set of file system blocks shared among the set of indirect blocks that have been pending deletion includes adding weight of each data block shared between the set of indirect blocks to a temporary merged weight value, wherein the temporary merged weight value is stored in memory of a storage system.

5. The method of claim 4, wherein updating metadata of the sibling indirect block with the temporary merged weight value includes adding the temporary merged weight value to a mapping pointer associated with each shared data block included in the sibling indirect block.

6. The method of claim 1, wherein the set of indirect blocks is deleted based on a delegated reference counting mechanism.

7. The method of claim 1, wherein at least one additional replica of the file is identified which is pending deletion upon receiving a request to delete a set of replicas of a file of a file system.

8. The method of claim 1, wherein weight information associated with a data block shared among at least two replicas of the file that are pending deletion is merged into a merged weight.

9. A system for use in managing file deletions in storage systems, the system comprising a processor configured to:
receive request to delete or truncate a set of replicas of a file of a file system, wherein a replica of the file represents a state of the file at a particular prior point in time, wherein the set of replicas of the file are included in a version set associated with the file;
identify a respective set of indirect blocks associated with each replica of the set of replicas, wherein the respective set of indirect blocks need to be deleted in order to process the request to delete or truncate the set of replicas of the file, wherein each indirect block includes a set of file system blocks and the set of file system blocks are identified for deletion in order to delete the indirect block;
identify a sibling indirect block in the file or another replica of the file in the version set, wherein the sibling indirect block includes a set of file system blocks, the sibling indirect block and each respective set of indirect blocks share a subset of the set of file system blocks that have been identified for deletion in order to process the request to delete or truncate the set of replicas of the file;
merge respective weight information associated with each file system block of the subset of the set of file system blocks shared among the respective set of indirect blocks that have been identified for deletion into a single merged weight value, wherein the set of indirect blocks are processed for deletion concurrently; and
update metadata of the sibling indirect block with the single merged weight value thereby avoiding updating metadata of each file system block of the subset of the set of file system blocks.

10. The system of claim 9, further comprising:
delete the set of indirect blocks concurrently.

11. The system of claim 9, wherein a mapping pointer is associated with a file system block, wherein the mapping pointer includes a distributed weight indicating whether the file system block has been shared.

12. The system of claim 9, wherein merging the weight information associated with the subset of the set of file system blocks shared among the set of indirect blocks that have been pending deletion includes adding weight of each data block shared between the set of indirect blocks to a temporary merged weight value, wherein the temporary merged weight value is stored in memory of a storage system.

13. The system of claim 12, wherein updating metadata of the sibling indirect block with the temporary merged weight value includes adding the temporary merged weight value to a mapping pointer associated with each shared data block included in the sibling indirect block.

14. The system of claim 9, wherein the set of indirect blocks is deleted based on a delegated reference counting mechanism.

15. The system of claim 9, wherein at least one additional replica of the file is identified which is pending deletion upon receiving a request to delete a set of replicas of a file of a file system.

16. The system of claim 9, wherein weight information associated with a data block shared among at least two replicas of the file that are pending deletion is merged into a merged weight.

* * * * *